United States Patent [19]
Yasugaki et al.

[11] Patent Number: 5,479,224
[45] Date of Patent: Dec. 26, 1995

[54] IMAGE DISPLAY APPARATUS

[75] Inventors: Masato Yasugaki; Osamu Konuma; Kumi Kikuchi, all of Tokyo, Japan

[73] Assignee: Olympus Optical Co., Ltd., Tokyo, Japan

[21] Appl. No.: 149,657

[22] Filed: Dec. 22, 1993

[30]  Foreign Application Priority Data

Dec. 25, 1992 [JP] Japan ................... 4-346088

[51] Int. Cl.⁶ .................................................. G02B 27/14
[52] U.S. Cl. ........................... 353/101; 353/69; 359/630
[58] Field of Search .................................. 353/101, 100, 353/122, 69, 12, 13; 359/637, 632, 630; 345/8, 9

[56]  References Cited

U.S. PATENT DOCUMENTS

| | | | |
|---|---|---|---|
| 4,859,030 | 8/1989 | Rotier | 359/632 |
| 4,961,626 | 10/1990 | Fournier, Jr. et al. | |
| 4,968,123 | 11/1990 | Fournier, Jr. et al. | 359/630 |
| 4,969,714 | 11/1990 | Fournier, Jr. et al. | 359/630 |
| 5,357,372 | 10/1994 | Chen et al. | 359/637 |

FOREIGN PATENT DOCUMENTS

| | | |
|---|---|---|
| 3188777 | 8/1991 | Japan . |
| 4177986 | 6/1992 | Japan . |
| 5134208 | 5/1993 | Japan . |

*Primary Examiner*—William C. Dowling
*Attorney, Agent, or Firm*—Cushman, Darby & Cushman

[57]  ABSTRACT

A head-mounted display apparatus wherein an image displayed on an image display device is projected on an observer's eyeball, which is designed so that the displayed image can be observed at a desired angle of view and at a desired magnification by making the projection magnification changeable. The head-mounted image display apparatus includes an image display device (11) for displaying an image, and a projection optical system for projecting the image displayed on the image display device (11) onto an observer's eyeball. The projection optical system is composed of a first relay optical system (12), a second relay optical system (13), and an ocular optical system (14). The second relay optical system (13), which is an afocal optical system, is rotatable about an axis (16) perpendicular to the optical axis so that the projection magnification is changed in three steps by the rotation of the second relay optical system (13).

5 Claims, 8 Drawing Sheets

IMAGE DISPLAY APPARATUS

BACKGROUND OF THE INVENTION

The present invention relates to an image display apparatus which is retained on the observer's head. More particularly, the present invention relates to a headmounted display apparatus having a magnification varying function.

In a conventional head-mounted display apparatus, an image formed by an image display device is projected on an observer's eyeball at an initially set angle of view, as described in Japanese Patent Application Laid-Open (KOKAI) No. 03-188777 (1991). However, when the angle of view is fixed as in the conventional apparatus, various problems may arise according to the kind of image for observation. That is, when the angle of view is set relatively wide, as shown in FIG. 11(a), the magnification becomes high. However, an image seen at such a wide angle of view makes the observer feel a sensation of pressure and causes him or her to feel easily fatigued when observing such an image for a long time. In addition, since the pixels of the image display device are enlarged at a high magnification, curved lines of the displayed image are seen as uneven lines of pixels, as illustrated in FIG. 11(a). When the angle of view is set relatively narrow, as shown in FIG. 11(b), the image frame becomes small, so that the displayed image lacks force, and an image composed of fine lines becomes invisible.

In the conventional head-mounted display apparatus having a fixed angle of view, if an image according to NTSC, which has an aspect ratio of 4:3, is changed over to an image according to HDTV, which has an aspect ratio of 16:9, as described, for example, in Japanese Patent Application Laid-Open (KOKAI) No. 04-177986 (1992), the top and bottom of the image frame are cut, which makes the observer feel the images reduced in force.

SUMMARY OF THE INVENTION

In view of the above-described problems of the background art, it is an object of the present invention to provide a head-mounted display apparatus of the type wherein an image displayed on an image display device is projected on an observer's eyeball, which is designed so that the displayed image can be observed at a desired angle of view and at a desired magnification by making the projection magnification variable.

To attain the above-described object, the present invention provides an image display apparatus having an image display device for displaying an image, and a projection optical system for projecting the image displayed on the image display device onto an observer's eyeball. At least a part of the projection optical system is rotatable about an axis perpendicular to the optical axis so that the projection magnification is varied by the rotation of the rotatable part of the projection optical system.

In this case, the part of the projection optical system that is rotatable about an axis perpendicular to the optical system is preferably an afocal optical system.

The projection magnification may be automatically changed according to the kind of image to be displayed.

The image display apparatus may be provided with a device for canceling an image distortion occurring in the projection optical system by correcting the image displayed on the image display device in accordance with a change in the image distortion occurring in the projection optical system.

The image display apparatus may be provided with a device for changing the view angle of an image for observation by displaying the image in a compressed form in a part of the display area of the image display device.

In the present invention, at least a part of the projection optical system is adapted to be rotatable about an axis perpendicular to the optical axis so that the projection magnification is changed by the rotation of the rotatable part of the projection optical system. Accordingly, a desired view angle for observation and a desired magnification can be selected with a compact arrangement. By using electronic zooming in combination with the variable magnification optical system of the present invention, continuous zooming can be realized. In addition, it is possible to observe a distortion-free image at all times by detecting a state of the variable magnification optical system, and correcting the image displayed on the image display device so that the image distortion caused by the optical system is canceled.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The present invention is basically arranged such that the projection optical system of an image display apparatus, e.g., a head-mounted display apparatus, is provided with a magnification varying function, thereby enabling the user to select a desired angle of view for observation. In addition, when the aspect ratio is to be changed so that the image frame becomes wide relative to the frame height, for example, the magnification is automatically raised. To obtain the magnification varying function with a compact arrangement, a relay optical system is used, and a part or the whole of the optical system is rotated about an axis perpendicular to the optical axis to thereby vary the magnification. By using electronic zooming in combination with the above-described arrangement, continuous zooming can be realized. In addition, it is possible to observe a distortion-free image at all times by detecting a state of the variable magnification optical system, and correcting an image to be displayed on the image display device so that the image distortion caused by the optical system is canceled.

Embodiments of the present invention will be described below with reference to the accompanying drawings.

Figure 1A:
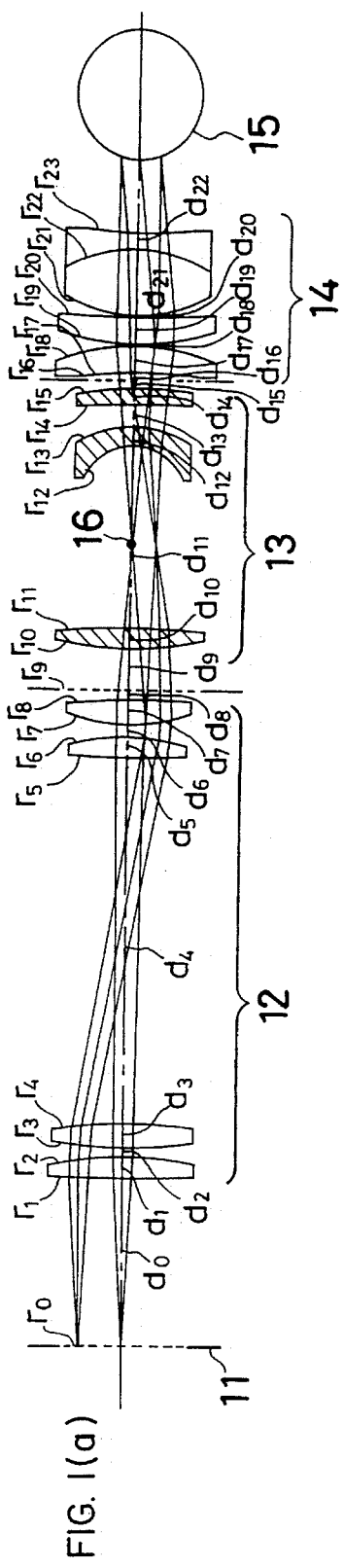
FIGS. 1(a)–1(c) show one example of the optical system of a head-mounted display apparatus according to a first embodiment of the present invention.
Figure 1B:
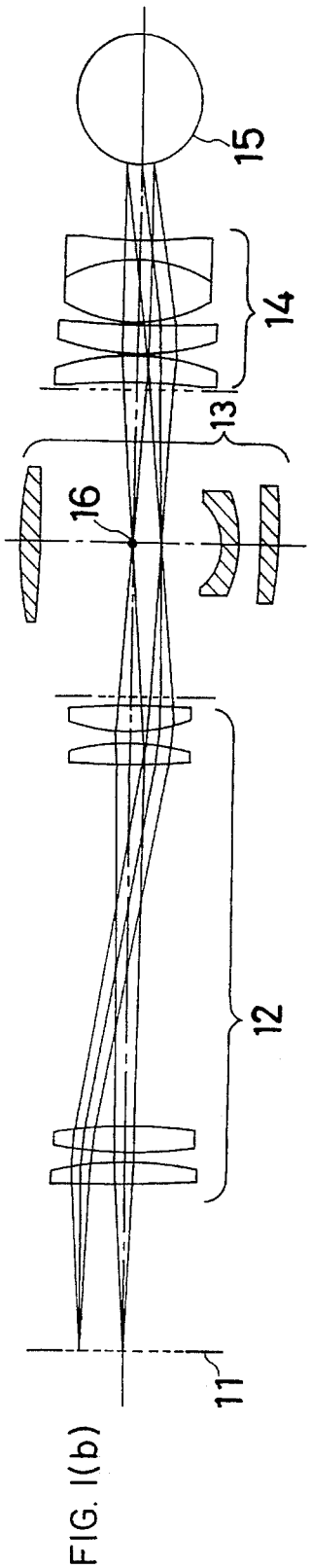
Figure 1C:
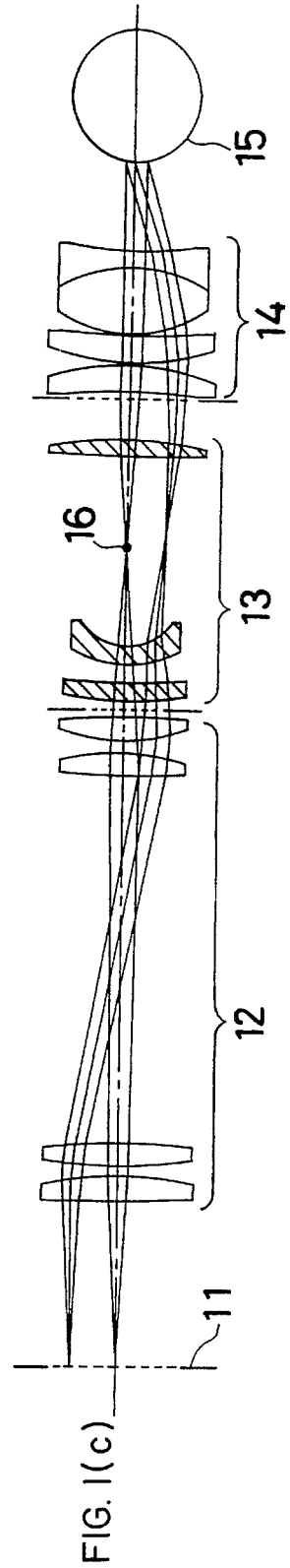

FIGS. 1(a)–1(c) show one example of the optical system of a turret variable magnification head-mounted display apparatus according to a first embodiment of the present invention. In the FIGS., 1(a), 1(b) and 1(c) show the optical system when set at a low magnification, a medium magnification and a high magnification are depicted, respectively, by a magnification changeover operation. Rays of light emerging from an image display device 11, e.g., a liquid crystal display device, are led through a first relay optical system 12 to a second relay optical system 13. The second relay optical system 13 is arranged so that the object and image surfaces thereof lie in the same plane, as described later. The second relay optical system 13 is disposed so that the image surface of the first relay optical system 12 is coincident with the object surface (image surface) of the second relay optical system 13. An image formed by the second relay optical system 13 is projected on an eyeball 15 of a user of the head-mounted display apparatus by an ocular optical system 14.

Incidentally, the first and second relay optical systems 12 and 13 are each formed of an afocal optical system. If the second relay optical system 13 is represented by two thin lenses, the following relationship holds:

$$L_2 = \beta(1+\beta)f + \beta^2 L_1 \quad (1)$$

where $L_1$ is the distance from the front lens to the object point; $L_2$ is the distance from the rear lens to the object point; f is the focal length of the front lens; and $\beta$ is the magnification of the afocal optical system constituting the second relay optical system 13 (defined as $\beta=f'/f$, where f' is the focal length of the rear lens).

In the afocal optical system 13, it is necessary in order to make the object and image points coincident with each other to satisfy the condition of $L_2=L_1-(1+\beta)f$. Therefore, the optical system is arranged so that the image surface of the first relay optical system 12 is coincident with the position given by:

$$L_1 = f(1+\beta)/(1-\beta) \quad (2)$$

Thus, since the second relay optical system 13 is disposed so that the object and image surfaces thereof are coincident with each other, even when the second relay optical system 13 is reversed (rotated through 180°) about a point 16 where the optical axis intersects the plane in which the object and image surfaces coincide with each other, as shown in FIG. 1(c), the object surface of the ocular optical system 14, that is, the image surface of the second afocal relay optical system 13, is immovable.

Considering the above-described rotation, it is preferable that the plane where the object and image surfaces of the second afocal relay optical system 13 coincide with each other should lie in the vicinity of the center of the afocal optical system 13, with a view to arranging the second afocal relay optical system 13 in a compact form. For this purpose, it is necessary to satisfy the following condition:

$$0 < L_1 < (1+\beta)f \quad (3)$$

Furthermore, even when the second afocal relay optical system 13 is removed from the optical system, the conjugate relationship in the whole optical system is not broken. Therefore, if the second relay optical system 13 is rotated through approximately 90° about the point 16, as shown in FIG. 1(b), thereby practically removing it from the optical system so that the bundle of rays will not be vignetted by any of the lenses in the second relay optical system 13, it is possible to obtain a magnification intermediate between the magnification obtained when the second afocal relay optical system 13 is set in the position shown in FIG. 1(a) and the magnification obtained by rotating the second afocal relay optical system 13 through 180°, as shown in FIG. 1(c).

Examples of numerical values for the lens system in FIG. 1 are shown below. In the following: $r_0$, $r_1$, $r_2$ ... are the curvature radii of lens surfaces; $d_0$, $d_1$, $d_2$ ... are the spacings between adjacent lens surfaces; $n_{d1}$, $n_{d2}$ ... are the refractive indices of the lenses for the spectral d-line; and $v_{d1}$, $v_{d2}$ ... are the Abbe numbers of the lenses. The following lens data is for the lens system in the state shown in FIG. 1(c).

| | | | |
|---|---|---|---|
| $r_0 = \infty$(display-ing plane) | $d_0 = 25.7848$ | | |
| $r_1 = 306.1083$ | $d_1 = 4.0000$ | $n_{d1} = 1.51633$ | $v_{d1} = 64.15$ |
| $r_2 = -47.7603$ | $d_2 = 1.0000$ | | |
| $r_3 = 55.0646$ | $d_3 = 4.0000$ | $n_{d2} = 1.51633$ | $v_{d2} = 64.15$ |
| $r_4 = -102.8609$ | $d_4 = 56.7116$ | | |
| $r_5 = 197.9326$ | $d_5 = 4.0000$ | $n_{d3} = 1.51633$ | $v_{d3} = 64.15$ |
| $r_6 = -27.7873$ | $d_6 = 1.0000$ | | |
| $r_7 = 28.9316$ | $d_7 = 4.0000$ | $n_{d4} = 1.51633$ | $v_{d4} = 64.15$ |
| $r_8 = -216.5943$ | $d_8 = 1.1773$ | | |
| $r_9 = \infty$ | $d_9 = 1.0721$ | | |
| $r_{10} = 51.3367$ | $d_{10} = 3.0000$ | $n_{d5} = 1.51633$ | $v_{d5} = 64.15$ |
| $r_{11} = 250.9523$ | $d_{11} = 3.0000$ | | |
| $r_{12} = 17.7403$ | $d_{12} = 3.0000$ | $n_{d6} = 1.51633$ | $v_{d6} = 64.15$ |
| $r_{13} = 8.4168$ | $d_{13} = 28.6919$ | | |
| $r_{14} = 196.9942$ | $d_{14} = 3.0000$ | $n_{d7} = 1.51633$ | $v_{d7} = 64.15$ |
| $r_{15} = -50.6047$ | $d_{15} = 6.2360$ | | |
| $r_{16} = \infty$ | $d_{16} = 0.7190$ | | |
| $r_{17} = -247.9685$ | $d_{17} = 4.4000$ | $n_{d8} = 1.51633$ | $v_{d8} = 64.15$ |
| $r_{18} = -43.1797$ | $d_{18} = 0.3000$ | | |
| $r_{19} = 41.4108$ | $d_{19} = 4.2000$ | $n_{d9} = 1.61272$ | $v_{d9} = 58.75$ |
| $r_{20} = 185.3355$ | $d_{20} = 0.3000$ | | |
| $r_{21} = 21.4474$ | $d_{21} = 10.0000$ | $n_{d10} = 1.60300$ | $v_{d10} = 65.48$ |
| $r_{22} = -22.0988$ | $d_{22} = 3.0000$ | $n_{d11} = 1.78472$ | $v_{d11} = 25.68$ |
| $r_{23} = 104.3221$ | | | |

In the above-described lens data, $r_0$ represents the display surface of the image display device 11, and $d_0$ represents the distance from the display surface of the image display device 11 to the 1-st lens surface $r_1$ of the first afocal relay optical system 12. It should be noted that a group of lens surfaces from the 1-st lens surface $r_1$ to the 8-th lens surface $r_8$ represent the first afocal relay optical system 12, a group of lens surfaces from the 9-th lens surface $r_9$ to the 16-th lens surface $r_{16}$ represent the second afocal relay optical system 13, and a group of lens surfaces from the 17-th lens surfaces $r_{17}$ to the 23-rd lens surface $r_{23}$ represent the ocular optical system 14. The state shown in FIG. 1(*a*) is obtained by reversing (rotating through 180°) the lens elements of the second afocal relay optical system 13 with the respective positions of the 9-th lens surface $r_9$ and the 16-th lens surface $r_{16}$ made coincident with each other in the above-described data. The state shown in FIG. 1(*b*) is obtained by removing the lens elements between the 9-th lens surface $r_9$ to the 16-th lens surface $r_{16}$.

Figure 2:
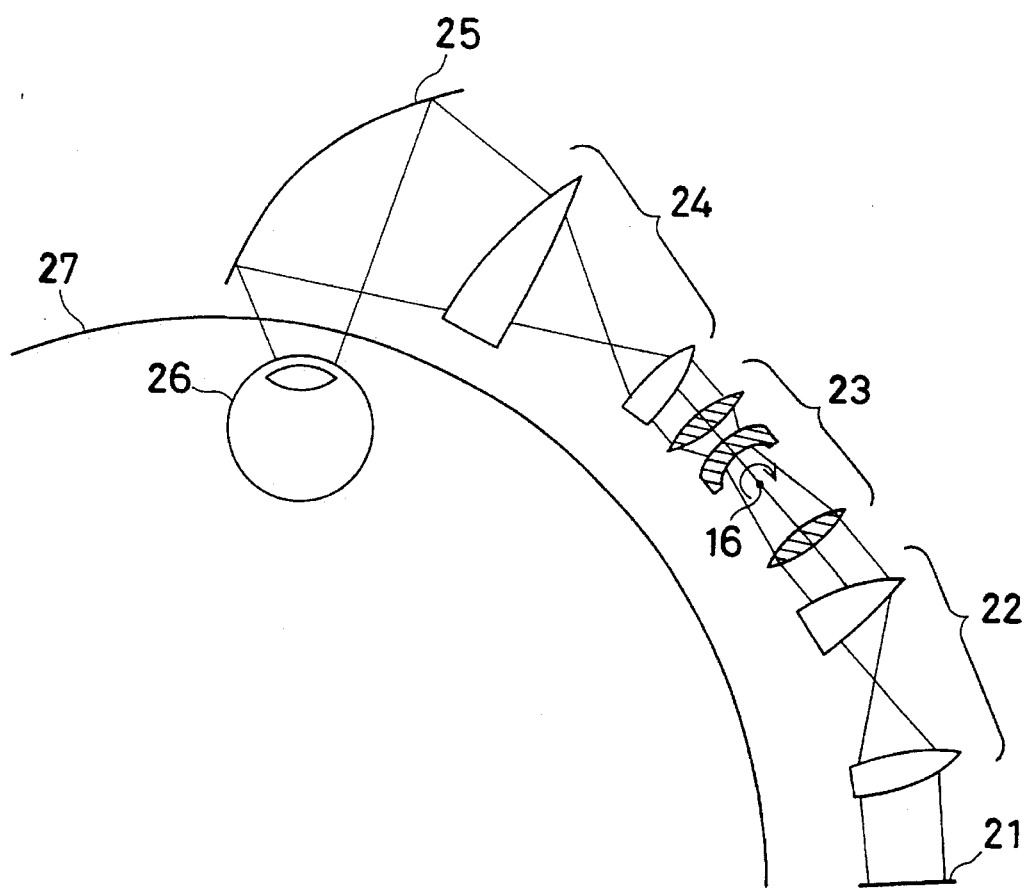
FIG. 2 schematically shows the optical system of a modification of the first embodiment.
Figure 3A:
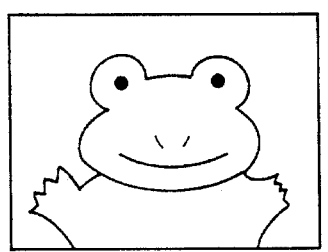
FIGS. 3(a) and 3(b) illustrate one example of application of a variable magnification optical system according to the present invention.
Figure 3A:
Figure 3A:
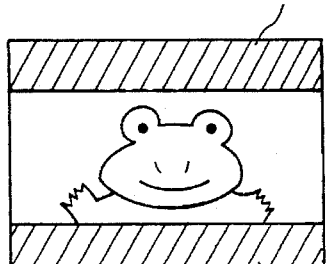
Figure 3B:
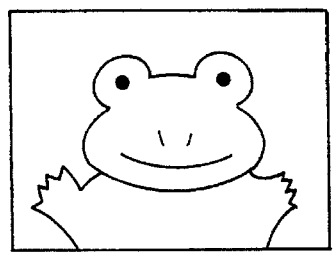
Figure 3B:
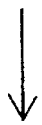
Figure 3B:
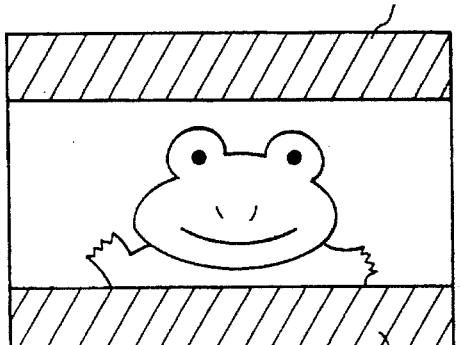

Although the above-described embodiment has a refracting coaxial optical system, the ocular optical system may be formed from a reflecting mirror 25 having a curved surface, as schematically shown in FIG. 2. In this case, in order to dispose the display apparatus along the observer's face 27, rays of light emerging from an image display device 21 are led through a first afocal relay optical system 22 having a decentered arrangement to a second afocal relay optical system 23, and an image formed by the second relay optical system 23 is led to the object surface of a curved reflecting mirror 25 by another decentered relay optical system 24. Then, the image is projected on an observer's eyeball 26 by the reflecting mirror 25. In this case also, the second afocal relay optical system 23 is rotatable about the point 16 for the purpose of varying the magnification.

Examples of application of the above-described variable magnification optical system include a function of automatically varying the magnification when images according to NTSC and HDTV are to be changed over from one to the other. That is, if an NTSC image is changed to an HDTV image without a change in the magnification, as described in Japanese Patent Application Laid-Open (KOKAI) No. 04-177986 (1992), the top and bottom 31 of the image frame are cut, as shown in FIG. 3(*a*), which makes the observer feel the image frame reduce in size. On the other hand, if a variable magnification optical system such as that shown in FIG. 1 or 2 is used and the magnification is automatically raised by rotating the second relay optical system 13 or 23 when an NTSC image is changed to an HDTV image, as shown in FIG. 3(*b*), the observer does not feel the image frame reduce in size although the top and bottom 31 of the image frame are cut.

Figure 4:
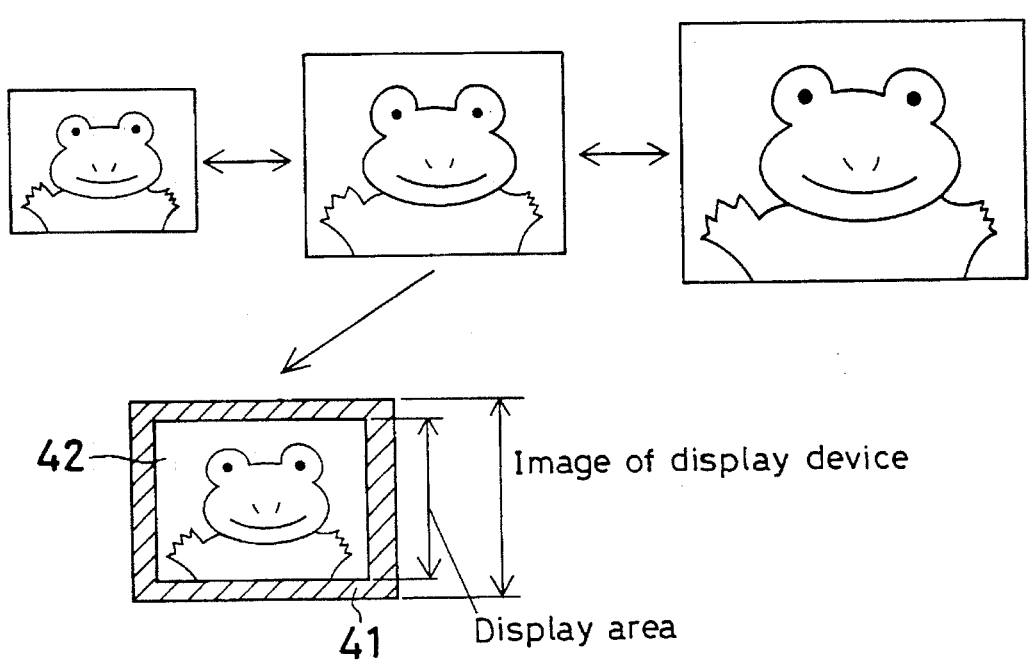
FIG. 4 illustrates the operation of a second embodiment in which the present invention is combined with electronic zooming.

A second embodiment of the present invention is arranged as follows: When it is desired to obtain an image smaller than the size of an image obtained at the low magnification or an image enlarged at a magnification intermediate between the low and medium magnifications or an image intermediate between the medium and high magnifications in the head-mounted display apparatus according to the first embodiment, the higher magnification is selected on each occasion, and the display area of the image display device is limited by the selected magnification, and a compressed image is displayed in the limited display area, thereby obtaining an image of the size corresponding to the intermediate magnification. This is called electronic zooming. Referring to FIG. 4, images of low, medium and high magnifications are selectively obtained by a variable magnification optical system such as that shown in FIG. 1 or 2. For example, an image enlarged at a magnification intermediate between the low and medium magnifications is optically displayed at the medium magnification. The peripheral region 41 of the display area on the image display device is cut, and the image is displayed in a compressed form in the remaining region 42, thus obtaining a magnification intermediate between the low and medium magnifications consequently. Thus, combination of magnification variation effected by the optical system and electronic zooming enables any desired magnification to be obtained and makes it possible to obtain a zoom ratio that cannot be attained by electronic zooming alone.

Figure 5:
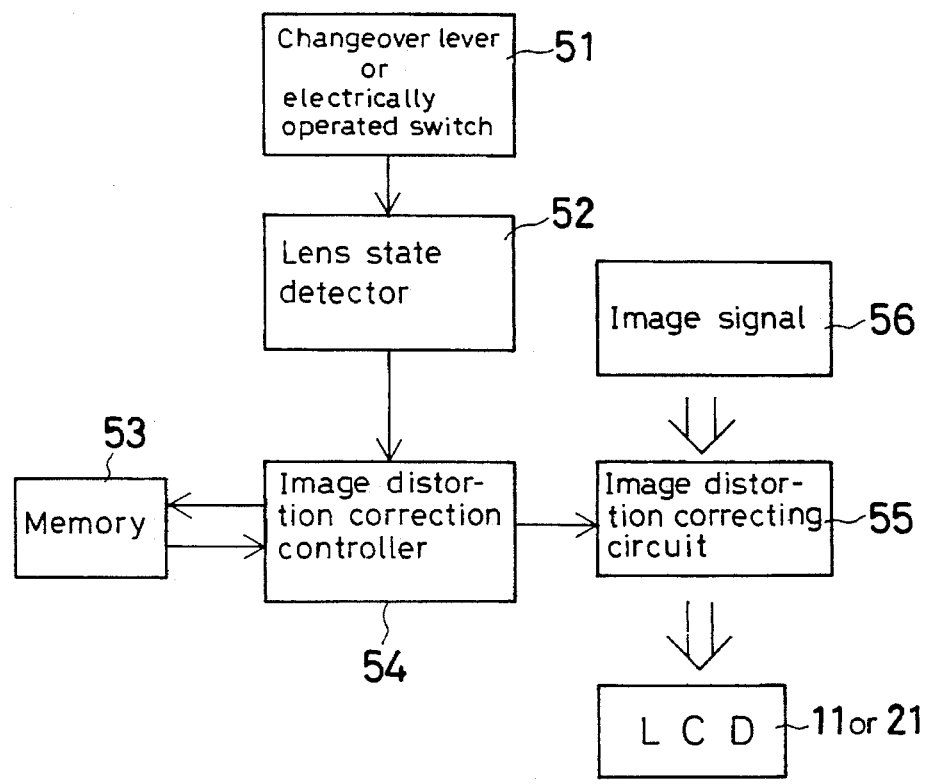
FIG. 5 is a block diagram of a system for electronically correcting an image distortion according to a third embodiment of the present invention.

Next, a third embodiment of the present invention will be described. This embodiment is adapted to electronically correct distortion (image distortion) at each magnification in a variable magnification optical system such as that shown in FIG. 1 or 2. In the case of the variable magnification optical system of the first embodiment, if the magnification changeover operation is manually conducted using a lever 51, as shown in the block diagram of FIG. 5, the present state (magnification) of the lens system can be detected by a lens state detector 52 attached to the lever unit or a rotating member. Image distortion correction information for each state of the lens system has previously been stored in a memory 53. An image distortion correction controller 54 receives information from the lens state detector 52 and selects correction information which is to be sent to an image distortion correcting circuit 55 by referring to the memory 53. The image distortion correcting circuit 55 corrects an image signal 56 to be displayed on the basis of the correction information and sends the corrected image signal 56 to the image display device (LCD) 11 or 21 (FIG. 1 or 2).

In a case where the magnification is changed by using an electrically operated switch in place of the manually operated lever, it is also possible to obtain the same function as the above by sending a signal from the electrically operated switch to the lens state detector 52, or by attaching the lens state detector 52 to a rotating member in the same way as in the case of the lever-operated system.

Figure 6A:
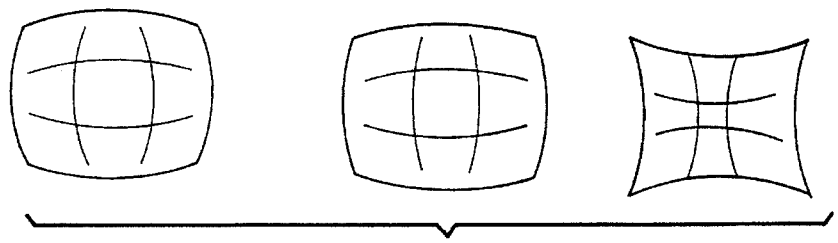
FIGS. 6(a) and 6(b) schematically show image distortions caused by an optical system and image distortion correction information stored in a memory in the third embodiment respectively.
Figure 6B:
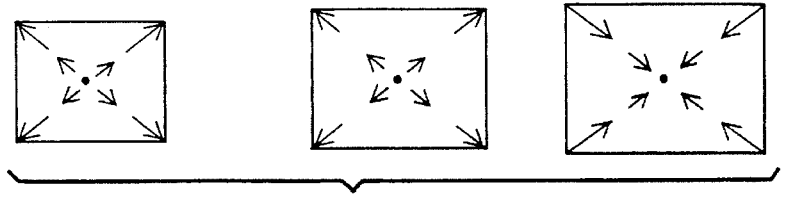
Figure 7:
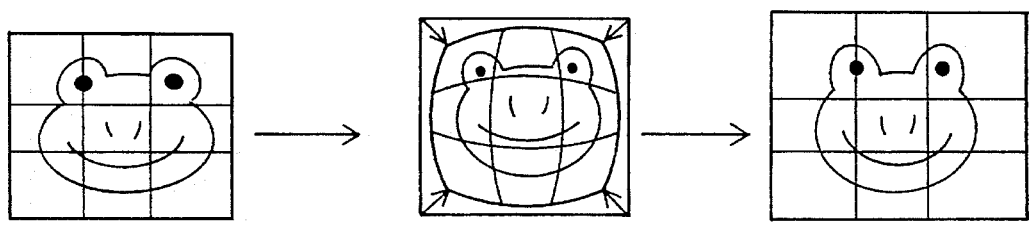
FIG. 7 illustrates the way in which an input image to be displayed is corrected, and also shows an image for observation.

FIGS. 6(*a*) and 6(*b*) schematically show image distortions caused by the optical system at the low, medium and high magnifications, FIG. 6(*a*), and also image distortion correction information stored in the memory 53, FIG. 6(*b*). FIG. 7 illustrates the way in which an input image to be displayed on the LCD is corrected on the basis of the image distortion correction information shown in FIG. 6(*b*) at the high magnification at which a pincushion image distortion occurs, for example, and also shows the observation image thus corrected. In this way, the observer can view a distortion-free image at all times irrespective of the state of the optical system.

Figure 8:
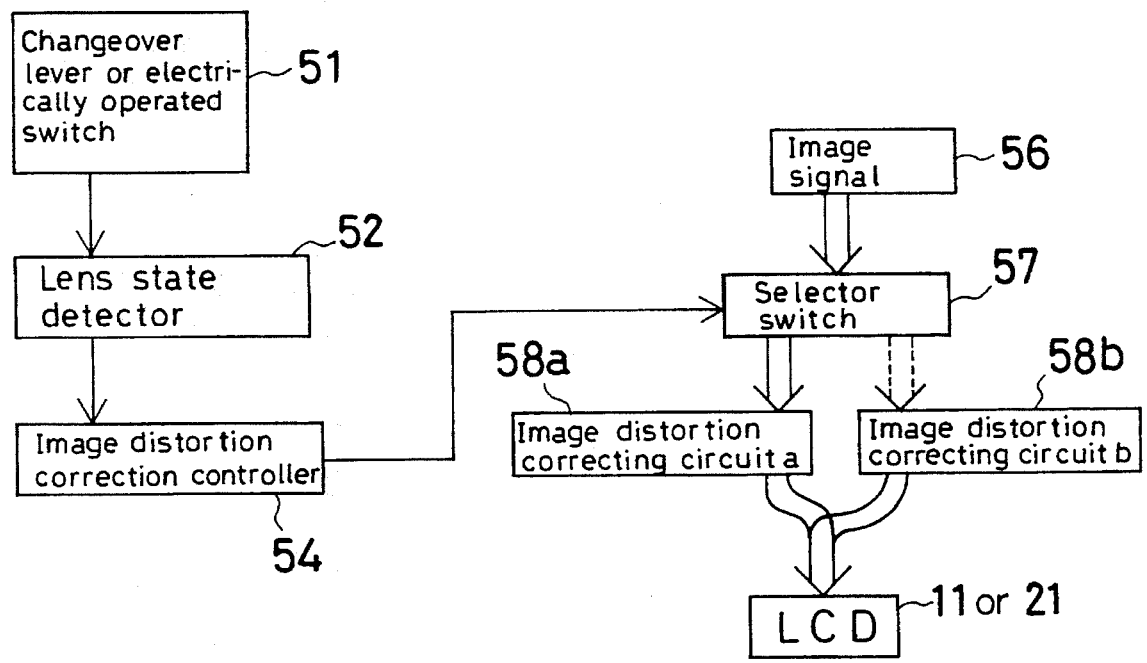
FIG. 8 is a block diagram of a system for electronically correcting an image distortion according to a fourth embodiment of the present invention.

Next, a fourth embodiment of the present invention will be described. This embodiment is the same as the first embodiment in the arrangement of the optical system but different therefrom in that exclusive image distortion correcting circuits are provided for two different states (magnifications) a and b of the optical system, and image signal paths are changed over from one to the other in accordance with the state of the optical system. More specifically, as shown in the block diagram of FIG. 8, the present state of the lens system is detected from a changeover lever or electrically operated switch 51 by a lens state detector 52, and information about the detected state is sent to an image distortion correction controller 54, in the same way as in the case of the arrangement shown in FIG. 5. In this embodiment, however, the image distortion correction controller 54 changes over a selector switch 57 to a proper position on the basis of the received information about the state of the lens system to select either of two exclusive image distortion correcting circuits 58*a* and 58*b*. An image signal 56 is corrected for image distortion in the image distortion correcting circuit 58*a* or 58*b* selected by the switch 57 in accordance with each particular magnification, and the corrected image signal 56 is sent to the image display device (LCD) 11 or 21.

Figure 9:
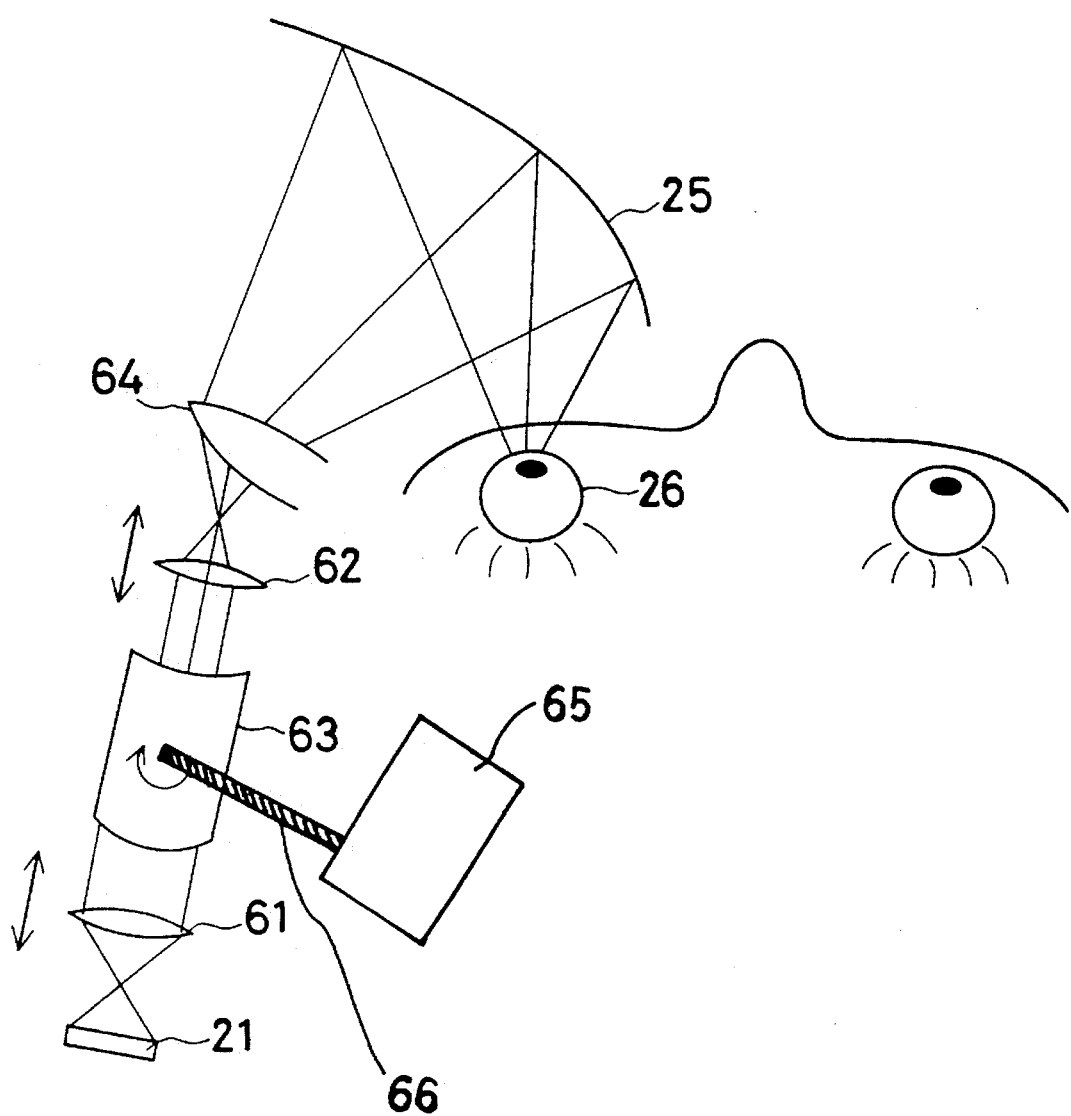
FIG. 9 schematically shows the optical arrangement of a fifth embodiment of the present invention.

Next, a fifth embodiment of the present invention will be described. This embodiment premises the magnification variation effected by rotation according to the present invention, and it is additionally provided with a zoom lens system including a variator and a compensator for the purpose of assisting the magnification variation by rotation and correcting aberrations. Thus, it is possible to vary the magnification continuously and also correct aberrations. FIG. 9 schematically shows the optical arrangement of this embodiment. Rays of light from the image display device 21 are led to an optical system composed of two lenses 61 and 62, which are movable along the optical axis, and an afocal optical system 63 similar to that shown in FIG. 1 or 2, which is disposed between the lenses 61 and 62, thereby forming an image. The image is led to the object surface of the curved reflecting mirror 25 by a decentered relay optical system 64 and projected on the observer's eyeball 26 by the reflecting mirror 25. In this case, the afocal optical system 63, which is disposed between the lenses 61 and 62, can be rotated through 180° about the point 16 by giving it rotation of a rotatively driving device 65, e.g., a motor, through a transmission device 66, thereby enabling the projection magnification of the optical system to be changed stepwisely in the same way as in the embodiments shown in FIGS. 1 and 2. In addition, the movement of the lenses 61 and 62 along the optical axis, shown by the arrows, enables correction of aberration variation caused by reversing or removal of the afocal optical system 63. Instead of or in addition to the correction of aberrations, the combination of lenses 61 and 62 enables the magnification to be continuously changed between each pair of adjacent magnifications, which are stepwisely changed over by the afocal optical system 63.

Figure 10A:
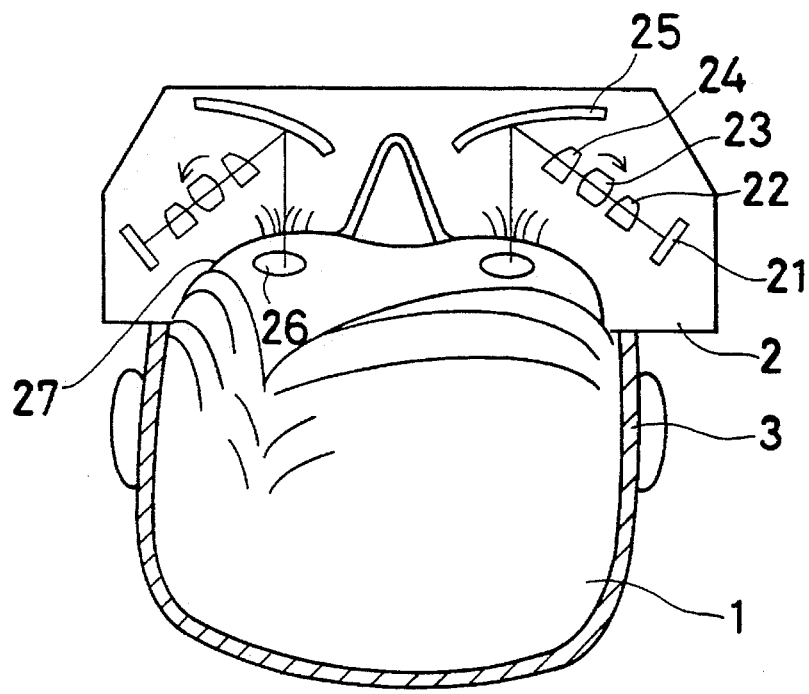
FIGS. 10(a) and 10(b) show in sectional and perspective views the general arrangement of one example in which the head-mounted display apparatus of the present invention is mounted on the observer's head.
Figure 10B:
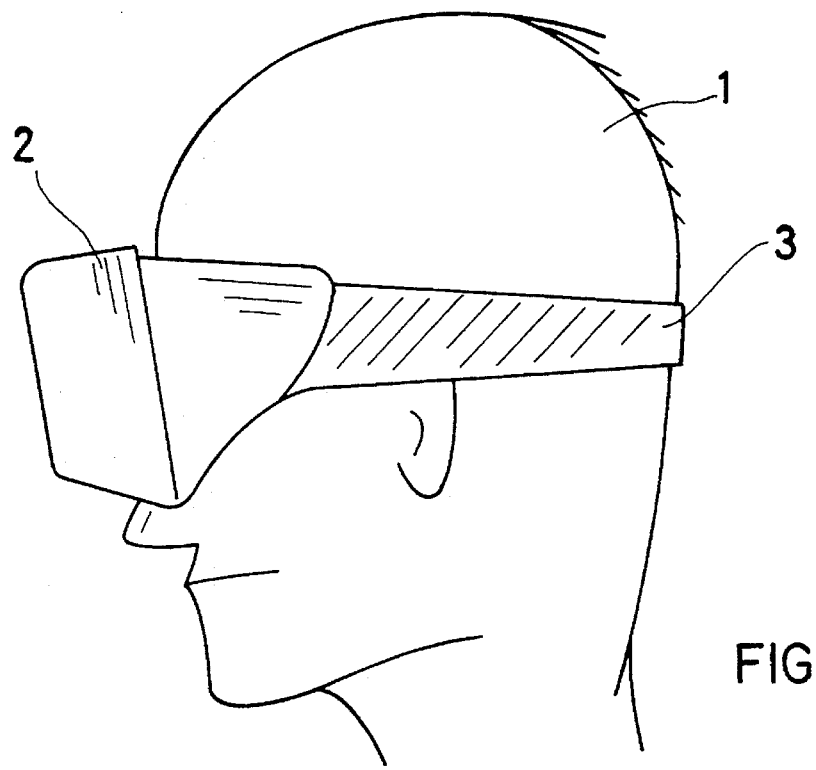
Figure 11A:
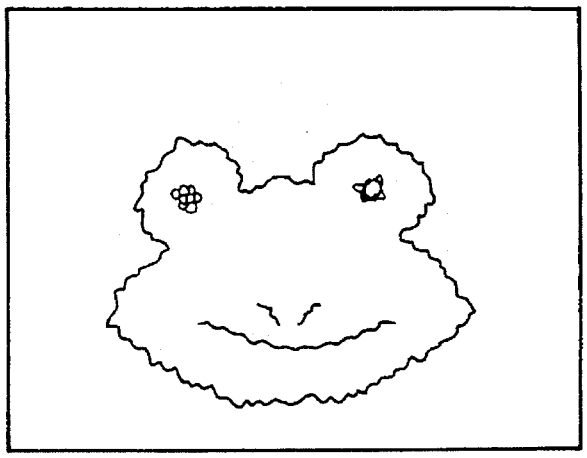
FIGS. 11(a) and 11(b) are views for explanation of problems of the background art.
Figure 11B:
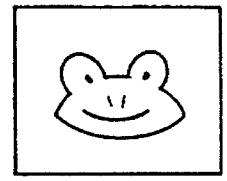

It should be noted that, in actual use, the head-mounted display apparatus (HMD) 2 of the present invention is mounted on the observer's head 1 with a head band 3 attached to the display apparatus, for example, as shown in FIG. 10(*a*), which is a sectional view showing the general arrangement of the display apparatus (in which the optical system shown in FIG. 2 is employed as an example), and also shown in FIG. 10(*b*), which is a perspective view of the general arrangement.

Although the image display apparatus of the present invention has been described by way of some embodiments, it should be noted that the present invention is not necessarily limited to these embodiments and that various changes and modifications may be imparted thereto. For example, the rotatable afocal optical system may be formed from a single thick lens 63, as shown in FIG. 9, in place of a plurality of lens elements. In addition, the rotatable optical system may be formed using an ordinary lens system in place of the afocal optical system. In such a case, focus correction should be made because an ordinary lens system generally comes out of focus when rotated.

As will be clear from the foregoing description, according to the image display apparatus of the present invention, at least a part of the projection optical system is adapted to be rotatable about an axis perpendicular to the optical axis so that the projection magnification is changed by the rotation of the rotatable part of the projection optical system. Accordingly, a desired view angle for observation and a desired magnification can be selected with a compact arrangement. By using electronic zooming in combination with the variable magnification optical system of the present invention, continuous zooming can be realized. In addition, it is possible to observe a distortion-free image at all times by detecting a state of the variable magnification optical system, and correcting the image displayed on the image display device so that the image distortion caused by the optical system is canceled.

What we claim is:

1. An image display apparatus comprising:

an image display device for displaying an image, and a projection optical system for projecting the image displayed on said image display device onto an observer's eyeball, wherein at least a part of said projection optical system is rotatable about an axis perpendicular to an optical axis, wherein rotation of at least said part of said projection optical system occurs in units of 90° so that projection magnification is changed by said rotation of at least said part of said projection optical system.

2. An image display apparatus comprising:

an image display device for displaying an image, and a projection optical system for projecting the image displayed on said image display device onto an observer's eyeball, wherein at least a part of said projection optical system is rotatable about an axis perpendicular to an optical axis so that projection magnification is changed by said rotation of at least said .part of said projection optical system, and wherein at least said part of said projection optical system is an afocal optical system.

3. An image display apparatus comprising:

an image display device for displaying an image, and a projection optical system for projecting the image displayed on said image display, device onto an observer's eyeball, wherein at least a part of said projection optical system is automatically rotated according to a variable aspect ratio to change projection magnification so that said image display device can project an image with an aspect ratio varied from that of the displayed image on the observer's eyeball.

4. An image display apparatus comprising:

an image display device for displaying an image, a projection optical system for projecting the image displayed on said image display device onto an observer's eyeball, and means for cancelling image distortion occurring in said projection optical system by correcting the image displayed on said image display device in accordance with a change in the image distortion occurring in said projection optical system, wherein at least a part of said projection optical system is rotatable about an axis perpendicular to an optical axis so that the projection magnification is changed by said rotation of the rotatable part of said projection optical system.

5. An image display apparatus comprising:

an image display device for displaying an image, a projection optical system for projecting the image displayed on said image display device onto an observer's eyeball, and means for changing a view angle of an image for observation by displaying the image in a compressed form in part of a display area of said image display device, wherein at least a part of said projection optical system is rotatable about an axis perpendicular to an optical axis so that the projection magnification is changed by rotation of at least said part of said projection optical system.

* * * * *